(12) United States Patent
Kim et al.

(10) Patent No.: US 10,325,138 B2
(45) Date of Patent: Jun. 18, 2019

(54) UNIT PIXEL OF FINGERPRINT SENSOR AND FINGERPRINT SENSOR INCLUDING THE SAME

(71) Applicant: Samsung Electronics Co., Ltd., Suwon-si, Gyeonggi-do (KR)

(72) Inventors: Sun Kwon Kim, Yongin-si (KR); Choong Hoon Lee, Seoul (KR); Yun Jeong Kim, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 58 days.

(21) Appl. No.: 15/392,242

(22) Filed: Dec. 28, 2016

(65) Prior Publication Data

US 2017/0286747 A1    Oct. 5, 2017

(30) Foreign Application Priority Data

Mar. 29, 2016    (KR) .................. 10-2016-0037917

(51) Int. Cl.
*G06K 9/00*    (2006.01)

(52) U.S. Cl.
CPC ....... *G06K 9/00087* (2013.01); *G06K 9/0002* (2013.01)

(58) Field of Classification Search
CPC .................................................. G06K 9/0002
See application file for complete search history.

(56) References Cited

U.S. PATENT DOCUMENTS

| 6,411,727 | B1* | 6/2002 | Harkin ................. G06K 9/0002 382/124 |
| 6,636,053 | B1 | 10/2003 | Gozzini |
| 6,882,164 | B2 | 4/2005 | Yano et al. |
| 6,927,581 | B2 | 8/2005 | Gozzini |
| 7,084,642 | B2* | 8/2006 | Gozzini ............... G06K 9/0002 324/663 |
| 7,663,380 | B2 | 2/2010 | Chuang et al. |
| 7,864,992 | B2* | 1/2011 | Riedijk ................ G06K 9/0002 382/124 |

(Continued)

FOREIGN PATENT DOCUMENTS

| JP | 2003/078365 A | 3/2003 |
| JP | 2005/114362 A | 4/2005 |

(Continued)

*Primary Examiner* — Utpal D Shah (74) *Attorney, Agent, or Firm* — Harness, Dickey & Pierce, P.L.C.

(57) ABSTRACT

A unit pixel of a fingerprint sensor is provided. The unit pixel includes a sensing electrode located to form a capacitance with an object touching a touch surface, a first switch connected between a first node and a second node to transmit at least one driving voltage input through the second node, the first node connected to the sensing electrode, the switch configured to the sensing electrode, an amplifier configured to receive a signal from the sensing electrode and amplify the signal, and a first capacitor connected between a first input terminal and an output terminal of the amplifier, the first capacitor configured to transmit the signal from the sensing electrode to the output terminal. The amplifier is configured to output a different output voltage according to the at least one driving based on an operation of the first switch.

12 Claims, 10 Drawing Sheets

(56) References Cited

U.S. PATENT DOCUMENTS

| | | | |
|---|---|---|---|
| 8,115,497 B2 | 2/2012 | Gozzini | |
| 9,721,140 B2 * | 8/2017 | Yang | G06K 9/0002 |
| 9,898,639 B2 * | 2/2018 | Lee | G06K 9/0002 |
| 9,916,490 B2 * | 3/2018 | Lee | G06K 9/0002 |
| 2003/0102874 A1 * | 6/2003 | Lane | G06K 9/0002 324/662 |
| 2005/0018884 A1 * | 1/2005 | Lee | G06K 9/00053 382/124 |
| 2005/0163351 A1 | 7/2005 | Kim et al. | |
| 2009/0067684 A1 * | 3/2009 | Mainguet | G06K 9/0002 382/124 |
| 2011/0163768 A1 * | 7/2011 | Kwon | G06F 3/044 324/686 |
| 2015/0009179 A1 * | 1/2015 | Kim | G06F 3/044 345/174 |
| 2015/0009186 A1 | 1/2015 | Landy | |
| 2015/0338955 A1 * | 11/2015 | Hamaguchi | G06F 3/044 345/174 |
| 2016/0070381 A1 * | 3/2016 | Park | G06F 3/044 327/306 |
| 2016/0179273 A1 * | 6/2016 | Lee | G06F 3/0416 345/174 |
| 2016/0357336 A1 * | 12/2016 | Jeong | G06F 3/0418 |
| 2016/0370943 A1 * | 12/2016 | Kim | G06F 3/044 |
| 2016/0378252 A1 * | 12/2016 | Jeong | G06F 3/044 345/174 |
| 2017/0373686 A1 * | 12/2017 | Wendt | H03K 17/955 |

FOREIGN PATENT DOCUMENTS

| | | |
|---|---|---|
| KR | 10-0431750 B1 | 5/2004 |
| KR | 10-0447141 B1 | 9/2004 |
| KR | 10-0473383 B1 | 3/2005 |
| KR | 10-1210473 B1 | 12/2012 |
| KR | 10-1520723 B1 | 5/2015 |

* cited by examiner

UNIT PIXEL OF FINGERPRINT SENSOR AND FINGERPRINT SENSOR INCLUDING THE SAME

CROSS-REFERENCE TO RELATED APPLICATIONS

This application claims priority under 35 U.S.C. § 119(a) from Korean Patent Application No. 10-2016-0037917 filed on Mar. 29, 2016, the disclosure of which is hereby incorporated by reference in its entirety.

BACKGROUND

Example embodiments of inventive concepts relate to a unit pixel of a fingerprint sensor, such as a unit pixel for increasing the strength of an output signal and/or a fingerprint sensor including the same.

Optical fingerprint sensors and semiconductor fingerprint sensors have been studied for finger scan sensors used in security and authentication systems. A capacitive sensor, a sort of semiconductor fingerprint sensor, senses a fingerprint by a difference in capacitance which occurs when a finger contacts a sensing electrode.

When a conventional fingerprint sensor is used, a signal is usually externally or internally applied to form a capacitance component between the surface of the user's finger and the top metal of a pixel.

SUMMARY

When the signal is applied to the finger, the user may feel uncomfortable. In addition, when the signal is internally applied, it is difficult to charge the top metal with high voltage due to a limit to a power supply voltage within a pixel. Therefore, a pixel structure which can be charged with high voltage without an external signal is desired.

According to some example embodiments of inventive concepts, there is provided a unit pixel including a sensing electrode located to form a capacitance with an object touching a touch surface, a first switch connected between a first node and a second node, the first node connected to the sensing electrode, the switch configured to transmit at least one driving voltage input through the second node to the sensing electrode, an amplifier configured to receive a signal from the sensing electrode and amplify the signal, and a first capacitor connected between a first input terminal and an output terminal of the amplifier, the first capacitor configured to transmit the signal from the sensing electrode to the output terminal. The amplifier is configured to output a different output voltage according to the at least one driving voltage based on an operation of the first switch.

According to other example embodiments of inventive concepts, there is provided a fingerprint sensor including a pixel array including a plurality of unit pixels and a voltage generator configured to generate at least one driving voltage. Each of the unit pixels includes a sensor configured to sense a capacitance generated from a sensing electrode based on the at least one driving voltage, a transmitter configured to transmit a signal output from the sensing unit, and an amplifier configured to amplify the signal output from the sensing unit and output an amplified signal to an output node. The amplifier is configured to output a different output voltage according to the at least one driving voltage.

According to other example embodiments of inventive concepts, a fingerprint sensor includes a pixel, the pixel including a first layer configured to establish a capacitance with a top surface of the pixel upon the top surface being contacted by an object in a first operating phase, the first layer configured to receive a driving voltage in the first operating phase and an amplifier configured to receive a signal based on the capacitance and receive a common voltage, the amplifier configured to output an output voltage based on the signal in the second operating phase, the amplifier further configured to output the common voltage in the first operating phase.

BRIEF DESCRIPTION OF THE DRAWINGS

The above and other features and advantages of inventive concepts will become more apparent by describing in detail example embodiments thereof with reference to the attached drawings in which.

DETAILED DESCRIPTION OF EXAMPLE EMBODIMENTS

Figure 1:
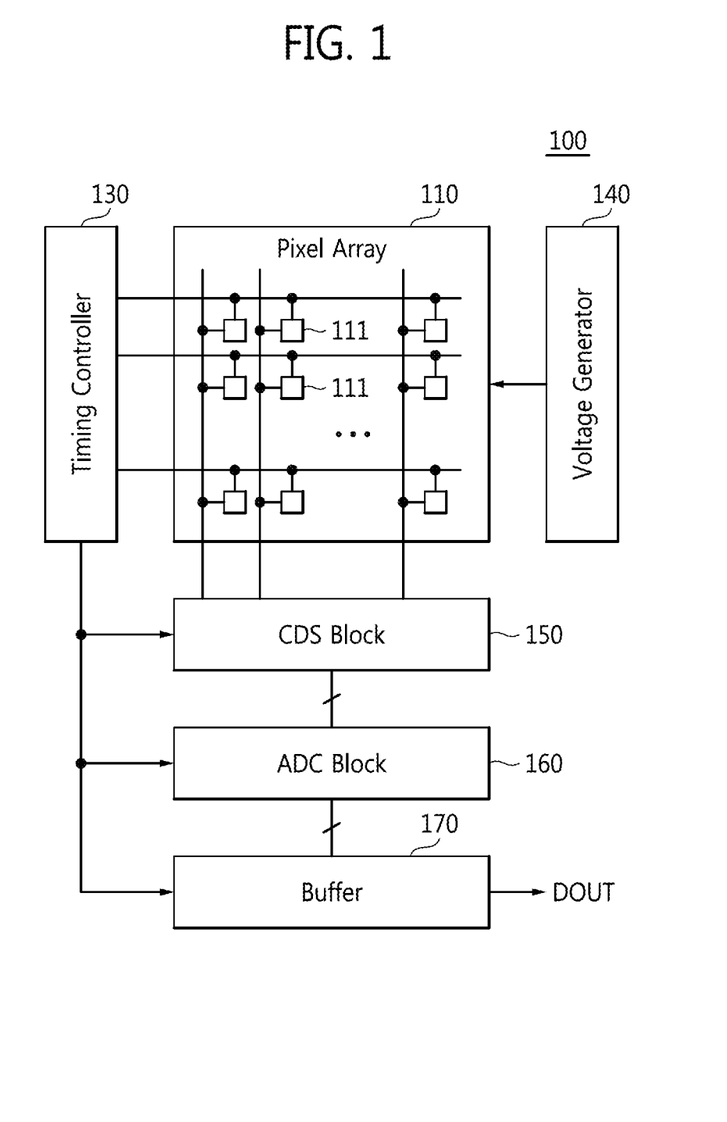
FIG. 1 is a schematic block diagram of a fingerprint sensor according to some example embodiments of inventive concepts.

FIG. 1 is a schematic block diagram of a fingerprint sensor 100 according to some example embodiments of inventive concepts. The fingerprint sensor 100 may include a pixel array 110, a timing controller 130, a voltage generator 140, a correlated double sampling (CDS) block (CDS circuitry) 150, an analog-to-digital conversion (ADC) block (ADC circuitry) 160, and a buffer 170.

The pixel array 110 includes a plurality of unit pixels 111 arranged in a matrix form. Each unit pixel 111 may include a sensing electrode which forms a capacitance with an object such as a user's finger.

The timing controller 130 may transmit a plurality of control signals for controlling the operation of the unit pixels 111 to the pixel array 110. The timing controller 130 also controls the operations of the CDS block 150, the ADC block 160, and the buffer 170.

The voltage generator 140 may generate a plurality of voltages (VD and VCM in FIG. 2) based on an external voltage from an outside of the fingerprint sensor 100. The CDS block 150 may perform CDS on pixel signals output from a plurality of column lines formed in the pixel array 110. The ADC block 160 may perform ADC on CDS signals output from the CDS block 150 and output a plurality of digital signals to the buffer 170. The buffer 170 stores pixel data output from the ADC block 160. The buffer 170 may amplify the pixel data to generate output data DOUT.

Figure 2:
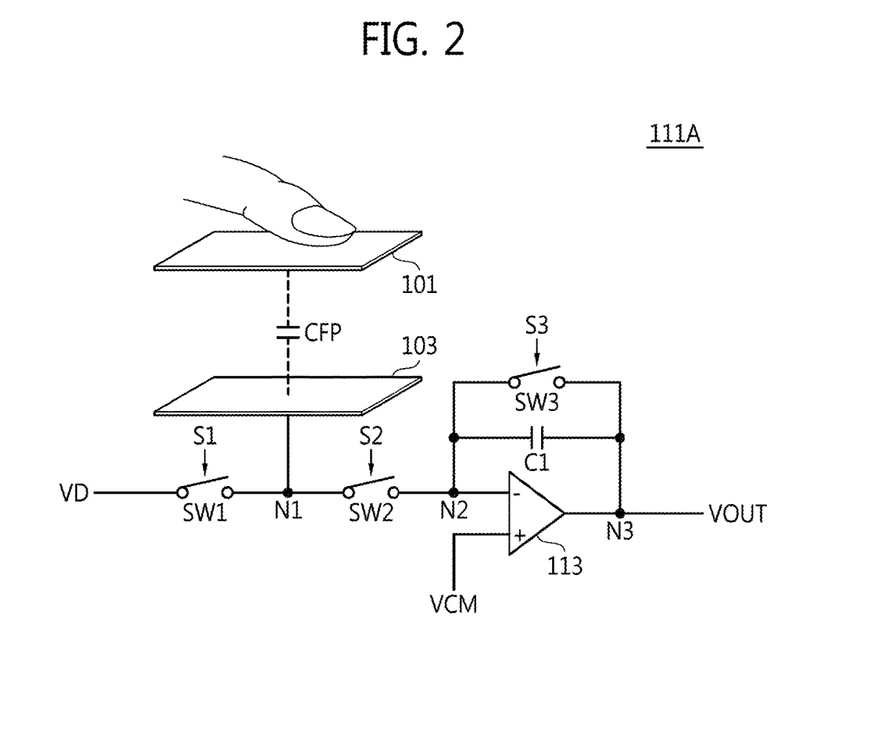
FIG. 2 is a circuit diagram of an example of a unit pixel illustrated in FIG. 1 according to some example embodiments of inventive concepts.
Figure 3A:
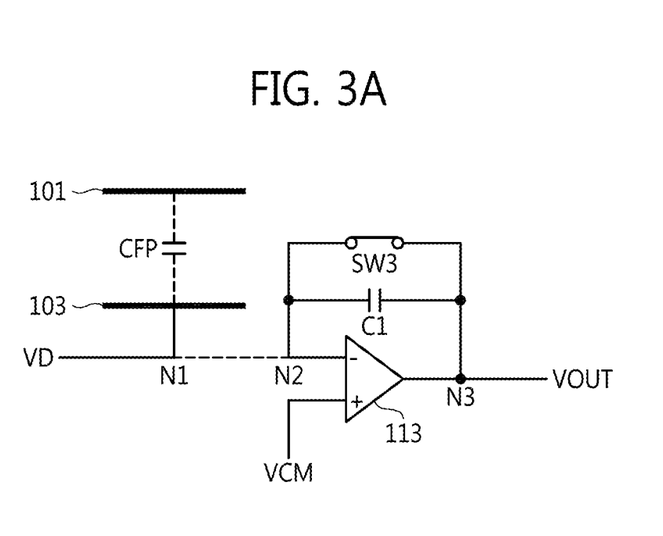
FIGS. 3A and 3B are diagrams for explaining a first operation of the unit pixel illustrated in FIG. 2 according to some example embodiments of inventive concepts.
Figure 3B:
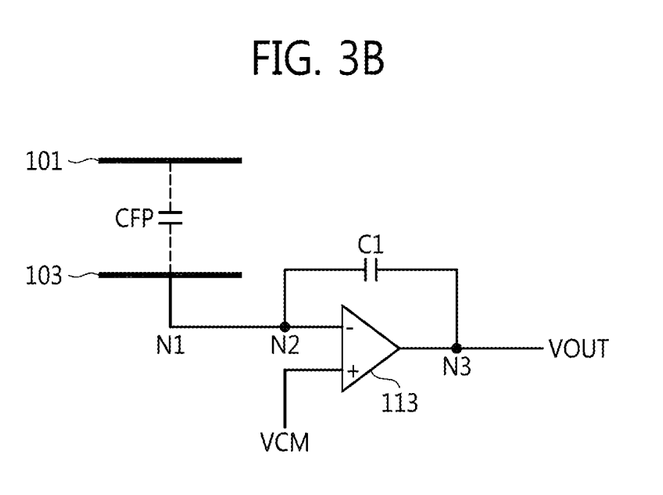

FIG. 2 is a circuit diagram of an example of the unit pixel 111 illustrated in FIG. 1 as a unit pixel 111A. FIGS. 3A and 3B are diagrams for explaining a first operation of the unit pixel 111A illustrated in FIG. 2. Referring to FIGS. 1 through 3B, the unit pixel 111A of the fingerprint sensor 100 may include first through third switches SW1 through SW3, a first capacitor C1, and an amplifier 113.

The unit pixel 111A may also include a sensing electrode 103 which senses a user's fingerprint when the user's finger touches a touch surface 101 placed on the top of the unit pixel 111A. The touch surface 101 may be placed on or above the sensing electrode 103 and may be formed of dielectric material or insulating material, but inventive concepts are not restricted thereto. The touch surface 101 may be formed of glass in other example embodiments.

When a user's finger touches the touch surface 101, a capacitance CFP is formed between the touch surface 101 and the sensing electrode 103. In other words, the finger acts as an electrode and the sensing electrode 103 acts as another electrode, so that the capacitance CFP is formed between the finger and the sensing electrode 103. Hereinafter, the capacitance CFP which is formed as described above is referred to as a second capacitor.

The first through third switches SW1 through SW3 may be turned on or off in response to first through third control signals Si through S3, respectively, output from the timing controller 130. The first switch SW1 is connected between a first node N1 and a node to which the driving voltage VD is applied. The first switch SW1 is turned on or off in response to the first control signal S1. The second switch SW2 is connected between the first node N1 and a second node N2, i.e., a first input terminal of the amplifier 113. The second switch SW2 is turned on or off in response to the second control signal S2. The third switch SW3 is connected between the second node N2 and a third node N3, i.e., an output terminal of the amplifier 113. The third switch SW3 is turned on or off in response to the third control signal S3. The first through third switches SW1 through SW3 may be implemented as transistors. The first and second switches SW1 and SW2 may be implemented as high-voltage transistors, but inventive concepts are not restricted thereto.

The first operation of the unit pixel 111A when the first through third switches SW1 through SW3 are turned on or off will be described with reference to FIGS. 3A and 3B. FIG. 3A shows a case where the first and third switches SW1 and SW3 are turned on and FIG. 3B shows a case where the second switch SW2 is turned on.

Referring to FIG. 3A, when the first switch SW1 is turned on, the second capacitor CFP is charged with the driving voltage VD applied from the voltage generator 140 through the first node N1. A difference in capacitance of the capacitor CFP may occur according to ridges and valleys in a fingerprint. At this time, the driving voltage VD may be higher than an operating voltage of the amplifier 113, but inventive concepts are not restricted thereto. The driving voltage VD may be equal to or lower than the operating voltage of the amplifier 113 in other example embodiments.

The second node N2 is connected with the third node N3 through the first capacitor Cl due to the third switch SW3 that is turned on at the same time as the first switch SW1. The first capacitor C 1 is reset and the amplifier 113 outputs the common voltage VCM applied to its second input terminal as the output voltage VOUT.

Referring to FIG. 3B, when the second switch SW2 is turned on after the first and third switches SW1 and SW3 are turned off, a signal output from the second capacitor CFP charged with the driving voltage VD is applied to the amplifier 113 through the second node N2. The amplifier 113 receives the signal from the second capacitor CFP through its first input terminal and outputs an amplified signal through the third node N3. The first capacitor C1 transmits the signal from the second capacitor CFP to the third node N3.

As a result, the unit pixel 111A outputs the output voltage VOUT defined as Equation 1:

$$VOUT = \frac{CFP}{C1} \cdot (VD - VCM). \tag{1}$$

In other words, when the unit pixel 111A is configured to operate in the first phase shown in FIG. 3A and then the second phase shown in FIG. 3B, the amplifier 113 is operated with a low voltage even if the high driving voltage VD is applied to the unit pixel 111A. Accordingly, the unit pixel 111A can output the high output voltage VOUT using the second capacitor CFP which is charged with the driving voltage VD higher than the operating voltage of the amplifier 113, so that the strength of an output signal is increased.

Figure 4:
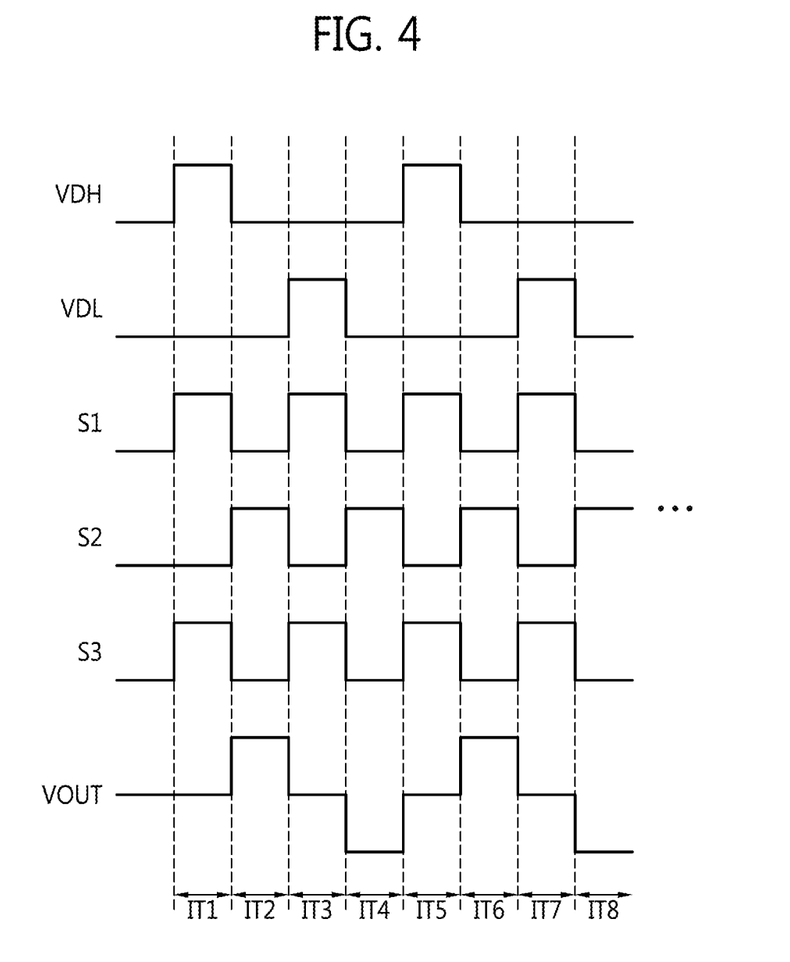
FIG. 4 is a timing chart showing a second operation of the unit pixel illustrated in FIGS. 3A and 3B according to some example embodiments of inventive concepts.

FIG. 4 is a timing chart showing a second operation of the unit pixel 111A illustrated in FIGS. 3A and 3B. Here, a driving voltage VDH or VDL is applied to the unit pixel 111A when the driving voltage VDH or VDL is at a high level and is not applied to the unit pixel 111A when the driving voltage VDH or VDL is at a low level.

Referring to FIGS. 1 through 4, the first driving voltage VDH and the second driving voltage VDL generated by the voltage generator 140 may be applied to the unit pixel 111A. The first driving voltage VDH is higher than the common voltage VCM applied to the second input terminal of the amplifier 113 and the second driving voltage VDL is lower than the common voltage VCM. The first driving voltage VDH may be lower than an external power supply voltage VDD and higher than the common voltage VCM applied to the second input terminal of the amplifier 113 and the second driving voltage VDL may be lower than the common voltage VCM and higher than a ground voltage GND.

During a first period IT1, the second capacitor CFP is charged with the first driving voltage VDH based on the first and third control signals 51 and S3 at a high level. The first capacitor Cl connected between the first input terminal and the output terminal of the amplifier 113 is reset and the amplifier 113 outputs the common voltage VCM.

During a second period IT2, a signal output from the second capacitor CFP charged with the first driving voltage VDH is transmitted to the first capacitor C1 through the second node N2 based on the second control signal S2 at a high level. As a result, the output voltage VOUT defined as Equation 2 may be output as a first output voltage:

$$VOUT = \frac{CFP}{C1} \cdot (VDH - VCM). \tag{2}$$

During a third period IT3, the second capacitor CFP is charged with the second driving voltage VDL based on the first and third control signals S1 and S3 at the high level. The first capacitor C1 connected between the first input terminal and the output terminal of the amplifier 113 is reset and the amplifier 113 outputs the common voltage VCM.

During a fourth period IT4, a signal output from the second capacitor CFP charged with the second driving voltage VDL is transmitted to the first capacitor C1 through the second node N2 based on the second control signal S2 at the high level. As a result, the output voltage VOUT defined as Equation 3 may be output as a second output voltage:

$$VOUT = \frac{CFP}{C1} \cdot (VDL - VCM). \quad (3)$$

The operation performed during fifth through eighth periods IT5 through IT8 is substantially the same as the operation performed during the first through fourth periods IT1 through IT4. Thus, detailed descriptions thereof will be omitted.

Consequently, the CDS block 150 performs CDS based on the difference between the first output voltage generated when the first driving voltage VDH is applied and the second output voltage generated when the second driving voltage VDL is applied, so that an offset of an output signal of the unit pixel 111A is removed.

Figure 5A:
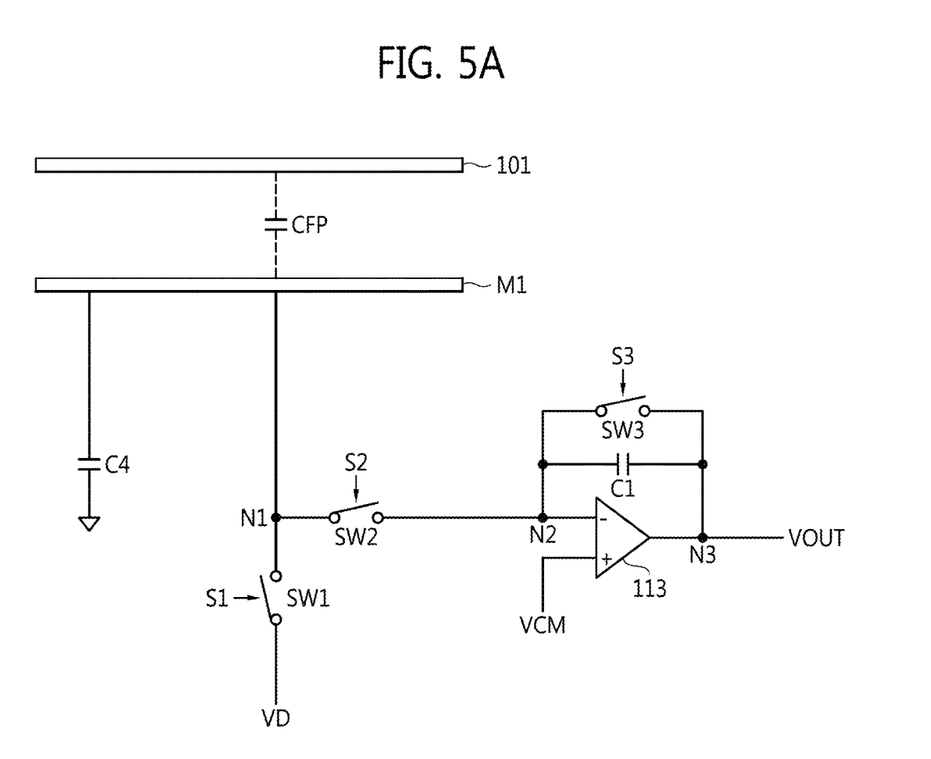
FIGS. 5A through 5C are circuit diagrams of another example embodiment of the unit pixel illustrated in FIG. 1.
Figure 5B:
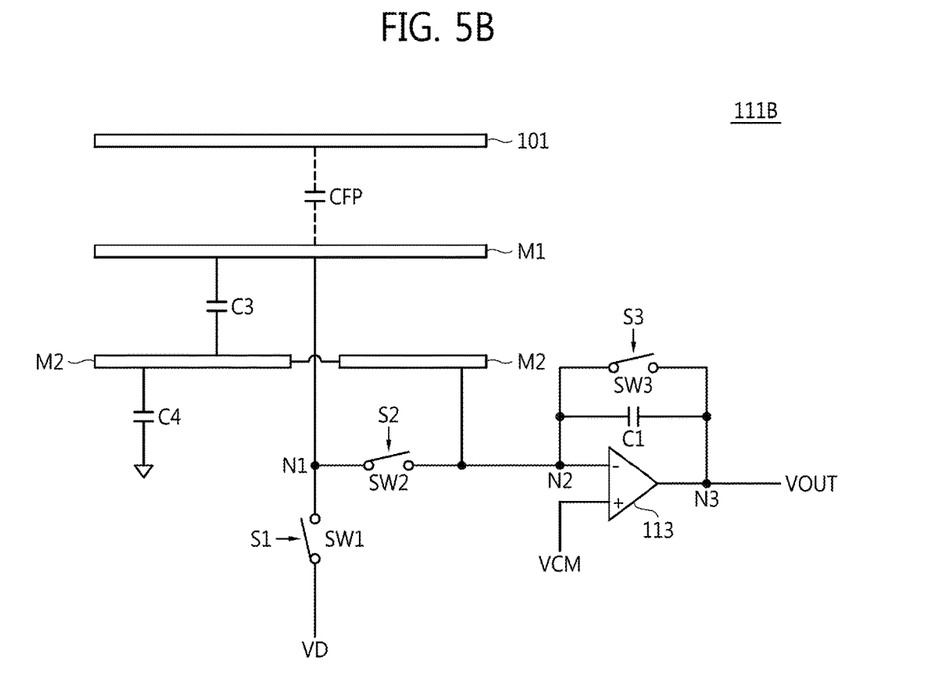
Figure 5C:
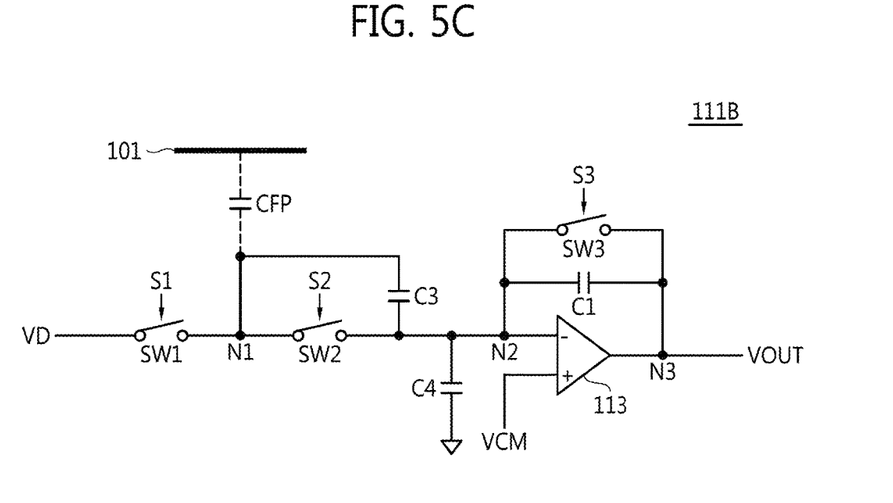

FIGS. 5B through 5C are circuit diagrams of another example of the unit pixel 111 illustrated in FIG. 1 as a unit pixel 111B. Referring to FIG. 5A, a parasitic capacitor C4 may be formed between a first metal layer M1 forming the sensing electrode 103 and a substrate. The parasitic capacitor C4 is connected in parallel with the second capacitor CFP formed above the first metal layer M1 and thus influences the second capacitor CFP.

Referring to FIG. 5B, a second metal layer M2 connected with the first input terminal of the amplifier 113 is formed below the first metal layer M1. The first metal layer M1 may be the highest metal layer (i.e., closet metal layer of the unit pixel 111B to the user's finger) and the second metal layer M2 may be the second highest metal layer. However, inventive concepts are not restricted thereto. At least one metal layer may be formed between the first metal layer M1 and the second metal layer M2.

When the second metal layer M2 connected with the second node N2 is formed in the unit pixel 111B, as shown in FIG. 5B, the second capacitor CFP is not influenced by the capacitor C4. However, a third capacitor C3 may be formed between the first metal layer M1 and the second metal layer M2. The third capacitor C3 is a parasitic capacitor formed between the bottom of the first metal layer M1 and the top of the second metal layer M2 and may have higher capacitance than the capacitor C4.

Referring to FIG. 5C, when the first switch SW1 is turned on, the second capacitor CFP is charged with the driving voltage VD and the third capacitor C3 is charged to a capacitance between the first metal layer M1 and the second metal layer M2. At this time, the second switch SW2 is turned off to initialize the first and second nodes N1 and N2. In other words, the first capacitor C1 is reset and the common voltage VCM appears at the second node N2 due to the third switch SW3 turned on at the same time as the first switch SW1. The third capacitor C3 may be charged to a capacitance induced by a difference between the driving voltage VD and the common voltage VCM due to the first metal layer M1 connected to the first node N1 and the second metal layer M2 connected to the second node N2.

When the second switch SW2 is turned on after the first and third switches SW1 and SW3 are turned off, both terminals of the third capacitors C3 are connected to each other through one node. Then, the third capacitors C3 is discharged, and therefore, a signal output from the second capacitor CFP charged with the driving voltage VD may be transmitted to the first capacitor C1 through the second node N2.

Consequently, the influence of the parasitic capacitor C4 is minimized in the unit pixel 111B due to the second metal layer M2 and the capacitance of the third capacitor C3 formed by placing the second metal layer M2 becomes null. As a result, a dynamic range of an output signal of the unit pixel 111B is increased.

Figure 6:
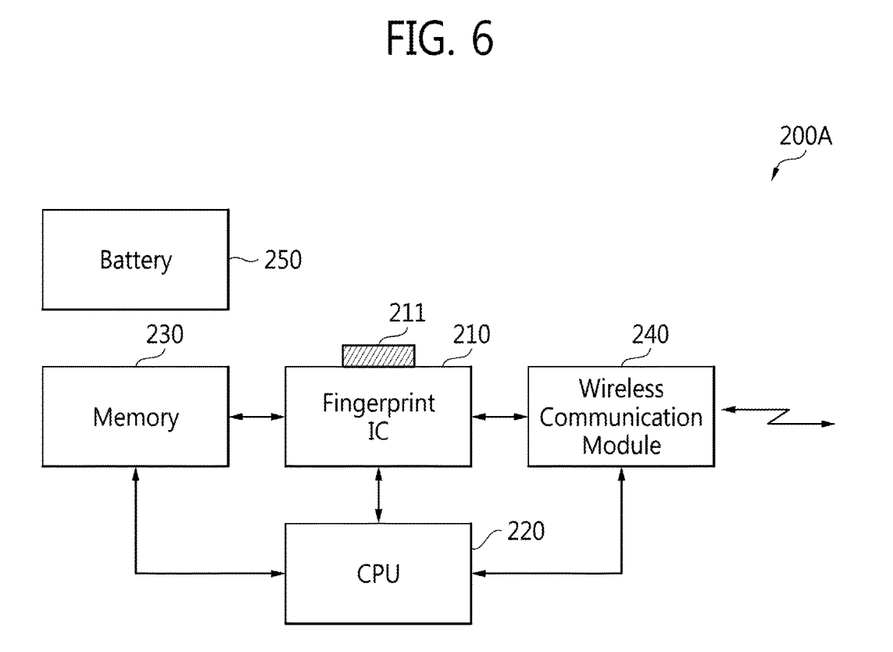
FIG. 6 is a block diagram of an authentication device including the fingerprint sensor illustrated in FIG. 1 according to some example embodiments of inventive concepts.

FIG. 6 is a block diagram of an authentication device 200A including the fingerprint sensor 100 illustrated in FIG. 1 according to some example embodiments of inventive concepts. The authentication device 200A includes a fingerprint sensor, i.e., fingerprint integrated circuit (IC) 210, a processor, i.e., a central processing unit (CPU) 220, a memory 230, a wireless communication module 240, and a battery 250. The fingerprint IC 210 may be the fingerprint sensor 100 illustrated in FIG. 1.

The battery 250 may supply an operating voltage to the fingerprint IC 210, the CPU 220, the memory 230, and the wireless communication module 240. The CPU 220 may control the operation of the elements 210, 230, and 240 by executing computer readable instructions stored in the memory 230.

The fingerprint IC 210 may be connected to a fingerprint acquisition region 211 to detect a user's fingerprint and may store fingerprint data in the memory 230 or output the fingerprint data to the CPU 220. The fingerprint IC 210 may also transmit the fingerprint data to an outside through the wireless communication module 240. The memory 230 may be implemented as volatile memory or non-volatile memory. The wireless communication module 240 may communicate with an external device such as a payment terminal (310 in FIG. 8) through a wireless local area network (WLAN) like wireless fidelity (Wi-Fi), a wireless personal area network (WPAN) like Bluetooth, a wireless universal serial bus (USB), ZigBee, near field communication (NFC), radio-frequency identification (RFID), or a mobile cellular network.

Figure 7:
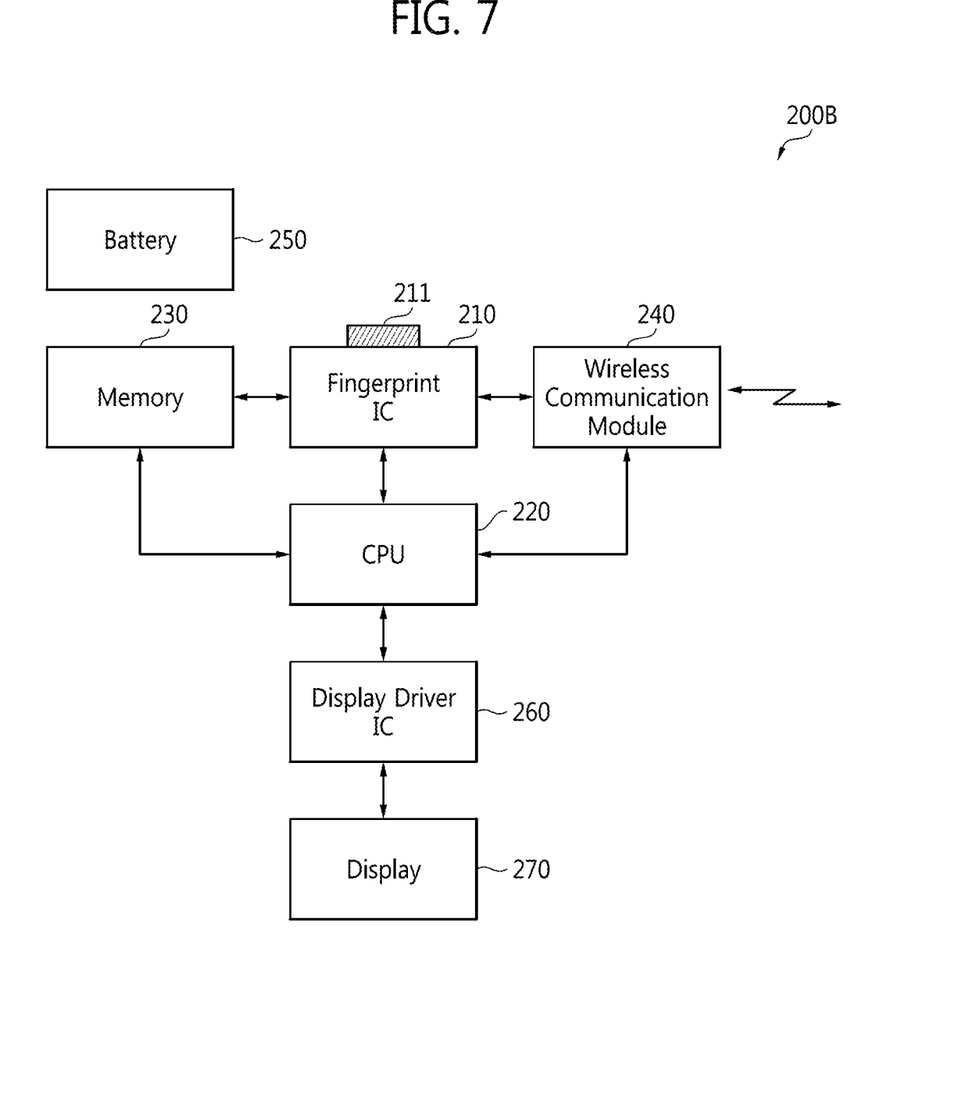
FIG. 7 is a block diagram of an authentication device including the fingerprint sensor illustrated in FIG. 1 according to other example embodiments of inventive concepts.

FIG. 7 is a block diagram of an authentication device 200B including the fingerprint sensor 100 illustrated in FIG. 1 according to other example embodiments of inventive concepts. Referring to FIGS. 1 through 7, the authentication device 200B may include the fingerprint sensor, i.e., the fingerprint IC 210 connected to the fingerprint acquisition region 211, the processor, i.e., the CPU 220, the memory 230, the wireless communication module 240, the battery 250, a display driver IC 260, and a display 270.

The battery 250 may supply an operating voltage to the elements 210, 220, 230, 240, 260, and 270. The CPU 220 may control the operation of the elements 210, 230, 240, 260, and 270.

The fingerprint IC 210 may be connected to the fingerprint acquisition region 211 to detect a user's fingerprint and may store fingerprint data in the memory 230 or output the fingerprint data to the CPU 220. The CPU 220 may transmit the fingerprint data to the display driver IC 260. The display driver IC 260 may display the fingerprint data on the display 270. The fingerprint data may also be transmitted to the external device according to the control of the CPU 220.

Figure 8:
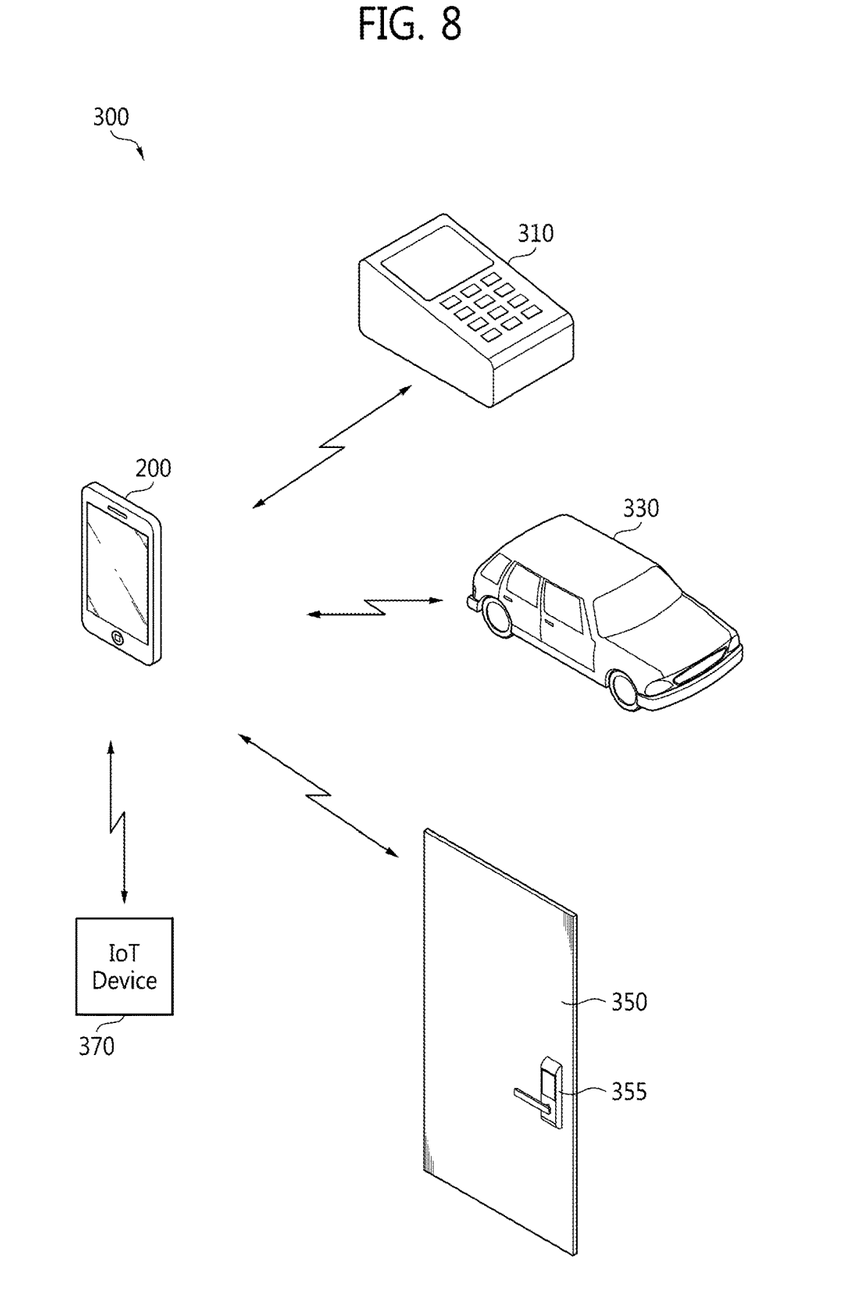
FIG. 8 is a diagram of an authentication system including the authentication device illustrated in FIGS. 6 and 7 according to some example embodiments of inventive concepts.

FIG. 8 is a diagram of an authentication system 300 including the authentication device 200 illustrated in FIGS.

6 and 7. Referring to FIGS. 6, 7 and 8, the authentication device 200 may be used as a device for mobile payment, a device for security solution, or a device for authentication solution. The authentication device 200 may communicate wireless signals with an automobile 330, a digital door lock 355, a payment terminal 310, and an IoT device 370 using the wireless communication module 240.

The processor 220 of the authentication device 200 may execute a mobile payment application program or software stored in the memory 230. User payment information for mobile payment may safely be stored in a secure area of the memory 230 according to the control of the processor 220. At this time, the user payment information may be encoded and stored in the secure area of the memory 230.

The mobile payment application program may perform mobile payment in association with the payment terminal 310 using the user payment information stored in the secure area of the memory 230. The user payment information may include identification information (e.g., credit card information, password, and fingerprint data) by which an authentic user of the authentication device 200 is identified. The identification information may be registered in the secure area of the memory 230 by the authentic user of the authentication device 200 using the mobile payment application program.

As described above, according to some example embodiments of inventive concepts, a unit pixel of a fingerprint sensor can be charged with high voltage, thereby increasing the strength of an output signal.

While inventive concepts have been particularly shown and described with reference to example embodiments thereof, it will be understood by those of ordinary skill in the art that various changes in forms and details may be made therein without departing from the spirit and scope of inventive concepts as defined by the following claims.

What is claimed is:

1. A unit pixel comprising:
   a sensing electrode located to form a capacitance with an object touching a touch surface;
   a first switch operably connected between a first node and an input node, the first node connected to the sensing electrode, the first switch configured to transmit a driving voltage input through the input node to the sensing electrode, the driving voltage not being a ground voltage;
   an amplifier configured to receive a signal from the sensing electrode and a common voltage, and compare the signal and the common voltage to output an output voltage; and
   a first capacitor operably connected between a first input terminal and an output terminal of the amplifier,
   wherein the capacitance between the object and the sensing electrode is charged by the driving voltage while the first switch is turned on,
   during a first period, the unit pixel charges the capacitance between the object and the sensing electrode with a first driving voltage and the amplifier outputs a first output voltage based on the capacitance that has been charged with the first driving voltage,
   during a second period, the unit pixel charges the capacitance between the object and the sensing electrode with a second driving voltage and the amplifier outputs a second output voltage based on the capacitance that has been charged with the second driving voltage, and
   the first driving voltage is higher than the common voltage and the second driving voltage is lower than the common voltage.

2. The unit pixel of claim 1, wherein, the unit pixel is configured to charge the capacitance between the object and the sensing electrode with the driving voltage based on a first control signal for controlling an operation of the first switch, and the unit pixel is configured to connect the first input terminal and the output terminal of the amplifier to each other and reset the first capacitor.

3. The unit pixel of claim 2, wherein the unit pixel is configured to transfer the signal based on the capacitance to the first input terminal of the amplifier.

4. The unit pixel of claim 1, wherein correlated double sampling is performed on the first and second output voltages.

5. The unit pixel of claim 1, wherein the first driving voltage is lower than an external power supply voltage and higher than the common voltage, a second input terminal of the amplifier is configured to receive the common voltage, and the second driving voltage is lower than the common voltage and higher than the ground voltage.

6. The unit pixel of claim 1, further comprising:
   a first metal layer forming the sensing electrode, the first metal layer including a top configured to form the capacitance, the first metal layer further including a bottom connected to the first node; and
   a second metal layer connected to the first input terminal of the amplifier,
   wherein the first metal layer is closer to the touch surface than the second metal layer.

7. The unit pixel of claim 6, wherein the capacitance with the object is a first capacitance, the first metal layer and the second metal layer form a second capacitance, the second metal layer and a substrate form a third capacitance, and the second capacitance is higher than the third capacitance.

8. The unit pixel of claim 7, wherein the second metal layer is configured to discharge the second capacitance and the third capacitance based on a first control signal.

9. A fingerprint sensor comprising:
   a pixel array including a plurality of unit pixels; and
   a voltage generator configured to generate driving voltages, the driving voltages not being a ground voltage,
   wherein each of the unit pixels includes,
   a sensor configured to sense a capacitance generated from a sensing electrode based on one of the driving voltages;
   a transmitter configured to transmit a signal output from the sensor; and
   an amplifier configured to receive the signal output from the sensor and a common voltage, and compare the signal and the common voltage to output an amplified signal to an output node,
   wherein the capacitance from the sensor is charged by a first driving voltage of the driving voltages during a first period,
   during the first period, the transmitter transmits a signal output from the sensor based on the first driving voltage and the amplifier outputs a first output voltage based on the signal output from the sensor during the first period,
   during a second period, the sensor outputs a signal generated from the sensing electrode based on a second driving voltage of the driving voltages and the amplifier outputs a second output voltage based on the signal output from the sensor during the second period, and
   the first driving voltage is higher than the common voltage and the second driving voltage is lower than the common voltage.

10. The fingerprint sensor of claim 9, wherein
the sensor is configured to sense the capacitance generated from the sensing electrode based on the one of the driving voltages and the amplifier is configured to be reset based on a first control signal, and
the transmitter is configured to transmit the signal output from the sensor to the amplifier based on a second control signal and after the first control signal is generated.

11. The fingerprint sensor of claim 10, wherein
the sensor includes a first transistor configured to operate in response to the first control signal, and
the transmitter includes a second transistor configured to operate in response to the second control signal.

12. The fingerprint sensor of claim 9, further comprising:
a correlated double sampling (CDS) circuit configured to perform CDS on the first and second output voltages transmitted from the unit pixels.

* * * * *